US010511205B2

(12) United States Patent
Kim et al.

(10) Patent No.: US 10,511,205 B2
(45) Date of Patent: Dec. 17, 2019

(54) DEVICE FOR ATTACHING/DETACHING IDLER HORN FOR ACTUATOR MODULE

(71) Applicant: ROBOTIS CO., LTD., Seoul (KR)

(72) Inventors: Byoung Soo Kim, Seoul (KR); Wook Jang, Gwangmyeong-si (KR); In Yong Ha, Seoul (KR)

(73) Assignee: ROBOTIS CO., LTD., Seoul (KR)

( * ) Notice: Subject to any disclaimer, the term of this patent is extended or adjusted under 35 U.S.C. 154(b) by 4 days.

(21) Appl. No.: 15/749,502

(22) PCT Filed: Mar. 31, 2016

(86) PCT No.: PCT/KR2016/003353
§ 371 (c)(1),
(2) Date: Feb. 1, 2018

(87) PCT Pub. No.: WO2017/007113
PCT Pub. Date: Jan. 12, 2017

(65) Prior Publication Data
US 2018/0219448 A1    Aug. 2, 2018

(30) Foreign Application Priority Data

Jul. 3, 2015  (KR) .................. 10-2015-0095434

(51) Int. Cl.
*H02K 5/22*     (2006.01)
*B25J 9/12*     (2006.01)
(Continued)

(52) U.S. Cl.
CPC .............. *H02K 5/225* (2013.01); *B25J 9/08* (2013.01); *B25J 9/102* (2013.01); *B25J 9/12* (2013.01);
(Continued)

(58) Field of Classification Search
CPC ....... B25J 9/08; B25J 9/102; B25J 9/12; B25J 19/0029; H02K 11/30; H02K 5/225;
(Continued)

(56) References Cited

U.S. PATENT DOCUMENTS 5,704,100 A    1/1998  Swan
2010/0163261 A1*   7/2010  Tomayko .............. B23B 45/008
                                                              173/47
(Continued)

FOREIGN PATENT DOCUMENTS

JP          10-141340 A        5/1998
KR     20100123176 A    *  11/2010
(Continued)

OTHER PUBLICATIONS

Translation of foreign document KR 20100123176 A (Year: 2010).*
(Continued)

*Primary Examiner* — Alex W Mok
(74) *Attorney, Agent, or Firm* — Revolution IP, PLLC (57) ABSTRACT

An embodiment of the present invention provides a device for attaching/detaching an idler horn for an actuator module which can have a motor, a reduction gear and a control circuit equipped therein. The device, for attaching/detaching an idler horn, comprises: a ring-shaped elastic switch which surrounds the inner end part of a cylindrical hollow portion provided on one side of a housing that forms the outer skin of an actuator module; and a ring-shaped cover member which is for fixing the ring-shaped elastic switch, wherein the ring-shaped elastic switch can be selectively attached/detached to/from an idler horn by means of elasticity.

6 Claims, 8 Drawing Sheets

(51) Int. Cl.
    *B25J 9/10*          (2006.01)
    *B25J 9/08*          (2006.01)
    *H02K 7/00*         (2006.01)
    *H02K 7/116*        (2006.01)
    *H02K 11/30*        (2016.01)
    *B25J 19/00*        (2006.01)

(52) U.S. Cl.
    CPC .......... *B25J 19/0029* (2013.01); *H02K 7/003* (2013.01); *H02K 7/116* (2013.01); *H02K 11/30* (2016.01); *Y10S 901/23* (2013.01); *Y10S 901/25* (2013.01)

(58) Field of Classification Search
    CPC ...... H02K 7/003; H02K 7/116; Y10S 901/23; Y10S 901/25
    USPC .......................................................... 310/71
    See application file for complete search history.

(56) References Cited

U.S. PATENT DOCUMENTS

| | | | | |
|---|---|---|---|---|
| 2012/0312259 | A1* | 12/2012 | Yamanaka | F01L 1/352 123/90.15 |
| 2013/0040774 | A1* | 2/2013 | An | B62M 6/65 475/149 |
| 2013/0221641 | A1* | 8/2013 | Kondo | B60R 21/2037 280/731 |
| 2013/0324345 | A1* | 12/2013 | Asakura | B62D 5/008 475/198 |
| 2014/0298939 | A1 | 10/2014 | Kim et al. | |
| 2014/0353068 | A1* | 12/2014 | Yamamoto | B62D 5/0412 180/444 |

FOREIGN PATENT DOCUMENTS

| | | | | |
|---|---|---|---|---|
| KR | 10-1115067 | B1 | 2/2012 | |
| KR | 10-1225139 | B1 | 1/2013 | |
| KR | 10-2013-0018402 | A | 2/2013 | |
| KR | 20130045693 | A * | 5/2013 | ............ B25J 9/1025 |
| KR | 10-1352388 | B1 | 1/2014 | |

OTHER PUBLICATIONS

Translation of foreign document KR 20130045693 (Year: 2013).*
International Search Report for PCT/KR2016/003353 dated Jul. 19, 2016 from Korean Intellectual Property Office.

* cited by examiner

FIG. 1

- Conventional Art -

DEVICE FOR ATTACHING/DETACHING IDLER HORN FOR ACTUATOR MODULE

TECHNICAL FIELD

The present invention relates to a device for attaching and detaching an idler horn of an actuator module, and more particularly, to a device for attaching and detaching a passive rotation member, i.e., an idler horn, installed at an actuator module including a motor and a reduction gear.

BACKGROUND ART

Actuator modules generally include a driving device (a motor) and a reduction gear and are widely used for general industrial use as well as for home and educational use. Specifically, that a plurality of actuator modules may be coupled to materialize an articulated robot capable of performing complicated operations has been receiving more attention lately.

Figure 1:
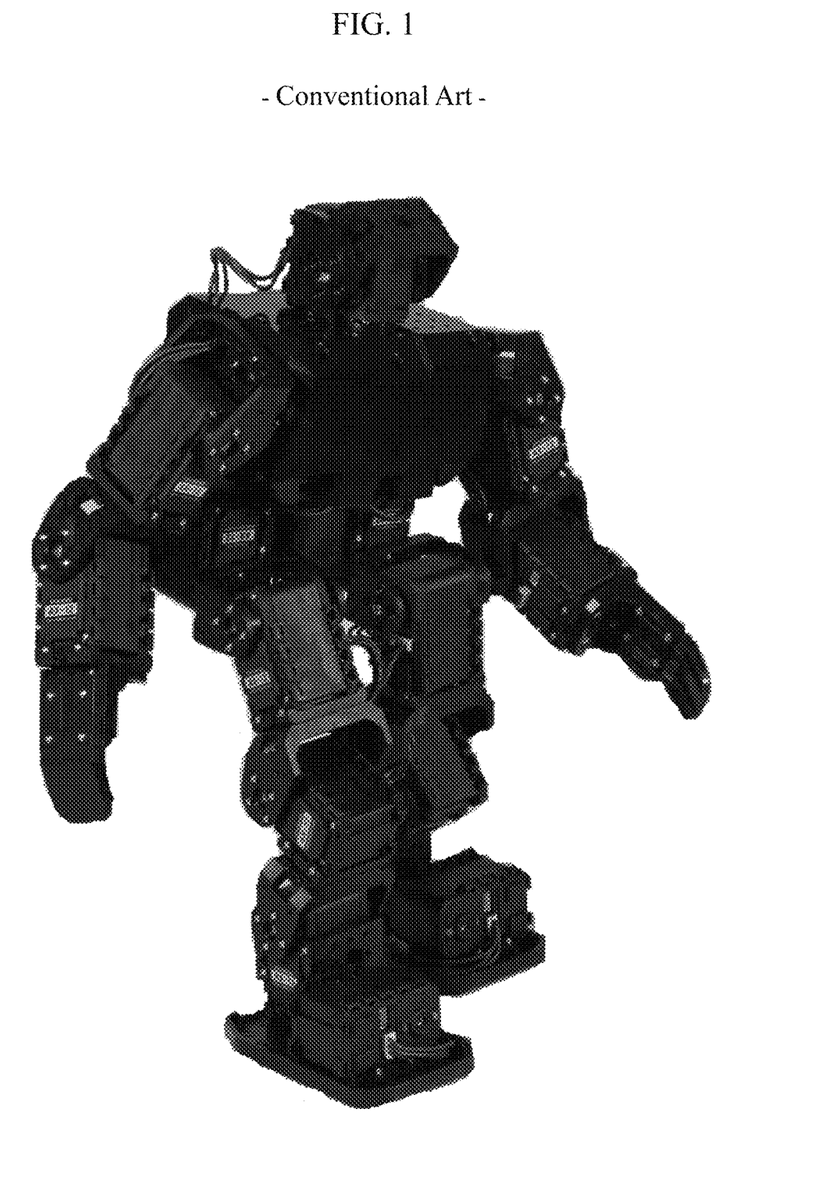
FIG. 1 is a photograph illustrating a humanoid type articulated robot using a conventional actuator module.

FIG. 1 is an actual photograph illustrating a humanoid type articulated robot which is implemented by coupling standardized actuator modules and connection members thereof (see Korean Patent Application Publication No. 10-2013-0018402). In such a robot, each of the actuator modules should be controlled according to a predetermined rule, and through such control, each of the actuator modules drives another actuator module or a module connection member such that various operations can be realized. For example, a humanoid type articulated robot should realize various operations simulating human actions.

Figure 2:
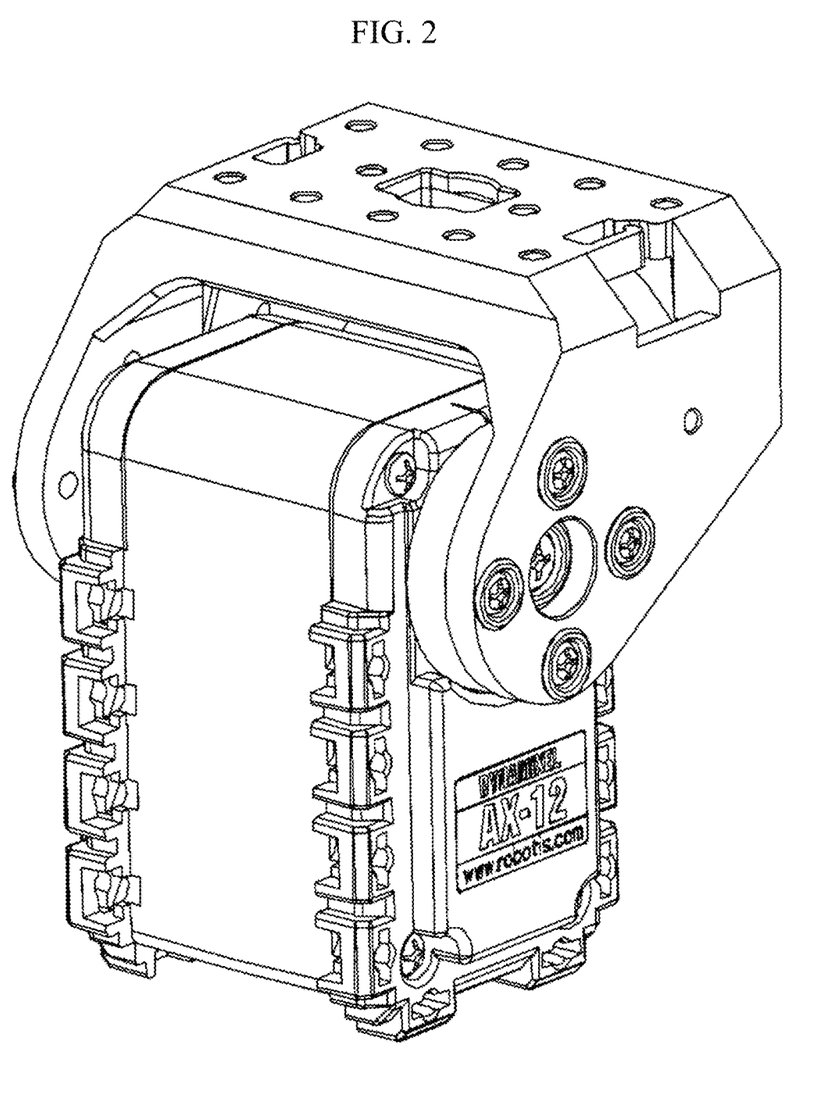
FIG. 2 is a diagram illustrating a state in which the conventional actuator module and a module connecting member are coupled.

FIG. 2 illustrates a state in which an actuator module (at a lower side) and a module connection member (at an upper side) are coupled to each other. A plurality of actuator modules are necessarily connected to module connection members on the basis of an active shaft of each of a plurality of actuator modules, and a coupling structure between the plurality of actuator modules and the module connection members is repeated such that a robot having a form shown in FIG. 1, or having a desired shape can be manufactured.

In most cases, one side of an actuator module is an active side and the other side thereof is a passive side. When a hinge type joint is used, a shaft configured to receive a driving force from a motor is installed at one side of an actuator module, and an idler horn configured to serve as a support member, which does not transfer the driving force, is installed at the other side of the actuator module. Unlike an active shaft, an idler horn is frequently attached and detached due to various reasons. For example, the idler horn needs to be detached due to damage to the idler horn, replacement of a tube-shaped bearing for a rotational movement of the idler horn, or the like. Therefore, a structure in which the idler horn can be conveniently attached and detached is required.

Wire arrangement is important in connecting an actuator module to a module connection member or another actuator module. Specifically, when a plurality of actuator modules are controlled by a central processing unit or a central controller, a plurality of wires for controlling and sensing are required, and the arrangement of these wires should not interfere with the driving of each of the plurality of actuator modules. Further, when the wires are complicatedly entangled, an exterior is poor. Furthermore, when the number of actuator modules constituting a robot increases, difficulty of wire arrangement becomes more serious such that problems may occur in which a driving range of an actuator is limited, a structure of the robot cannot be varied, and the like. In the past, there were attempts to implement a hollow type small-sized modular actuator, but due to limitations of an inner diameter of a bearing, there was an inconvenience in that cables needed to be passed through a hole first without a connector and were then assembled with the connector again, and a limitation in that maintenance was difficult when issues occurred.

In order to resolve such problems, the idler horn should be made to have a hollow structure and the cables should be connected to an interior of a housing through the hollow, and in this case, the need for attaching and detaching the hollow-type idler horn in order to connect the cables is even greater.

DISCLOSURE

Technical Problem

It is an objective of the present invention to provide a device for conveniently attaching and detaching an idler horn installed at an actuator module to and from a housing of the actuator module.

It should be understood that objectives of the present invention are not limited to the above-described objective, and a person skilled in the art can apparently understand another objective of the present invention, which are not mentioned above, from the following description.

Technical Solution

To achieve the objective, an embodiment of the present invention provides a device for attaching and detaching an idler horn of an actuator module, which allows a motor, a reduction gear, and a control circuit to be included therein, the device including a ring-shaped elastic switch configured to surround an inner side end of a cylindrical hollow portion provided at one surface of a housing which constitutes an outer surface of the actuator module; and a ring-shaped cover member configured to fix the ring-shaped elastic switch, wherein the ring-shaped elastic switch is selectively attached to and detached from the idler horn using an elastic force.

The ring-shaped elastic switch may include a protrusion installed to protrude inward in the hollow portion, and a trigger ring installed to protrude outward in the hollow portion, wherein the protrusion may be moved according to an external pressure applied to the trigger ring such that the protrusion and the idler horn may be engaged with each other or released from each other.

The protrusion may be provided as a pair of protrusions, and the pair of protrusions may be formed at positions facing each other in a ring-shaped main body of the ring-shaped elastic switch.

The trigger ring may be installed at a position between the pair of protrusions in the ring-shaped main body, and the pair of protrusions may be moved in a direction opposite a shaft direction as the trigger ring is moved in the shaft direction.

The idler horn may include a flange having a coupling hole; and include a cylindrical portion installed to protrude from the flange in the shaft direction, wherein a depressed portion may be formed at an outer side of the cylindrical portion in a circumferential direction thereof and may be concave-convexly coupled with the protrusions of the ring-shaped elastic switch.

A tube-shaped bearing may be installed between the ring-shaped elastic switch and the idler horn.

Advantageous Effects

In accordance with the embodiment of the present invention, a device for conveniently attaching and detaching an idler horn installed at an actuator module to and from a housing of the actuator module can be provided. Specifically, when a hollow-type idler horn is used for wire arrangement in the actuator module, a device for simply attaching and detaching the hollow-type idler horn to and from the housing can be provided.

It should be understood that effects of the present invention are not limited to the above-described effect and include all effects that can be deduced from the detailed description of the present invention or the configuration thereof defined by the appended claims.

DESCRIPTION OF REFERENCE NUMERALS

1: actuator module
A: idler horn attaching/detaching device
10: first housing
20: second housing
30: active shaft
40: passive idler horn
50: tube-shaped bearing
70: ring-shaped elastic switch
80: ring-shaped cover member

[Modes Of The Invention]

Hereinafter, the present invention will be described with reference to the accompanying drawings. The present invention, however, may be implemented in various different forms, and thus it is not limited to embodiments which will be described below. In the drawings, some portions not related to the description will be omitted in order to clearly describe the present invention, and similar reference numerals are given to similar components throughout the present invention.

Throughout the present invention, when a portion is referred to as being "connected" (accessed, contacted, or coupled) to other portion, it may include a case in which the portion is "directly connected" to the other portion as well, and a case in which the portion is "indirectly connected" to the other portion with another member interposed therebetween. Also, when a portion is referred to as "including" a component, it may mean that another component is further included and is not to be excluded unless specifically stated otherwise.

Terms used herein are for the purpose of describing only specific embodiments and are not intended to be limiting of the present invention. Unless the context clearly dictates otherwise, the singular form includes the plural form. In this present invention, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Hereinafter, embodiments of the present invention will be described in detail with reference to the accompanying drawings. Prior to describe a configuration of an idler horn attaching and detaching device, a structure of an actuator module in which the idler horn attaching and detaching device is provided will be described first.

Figure 3:
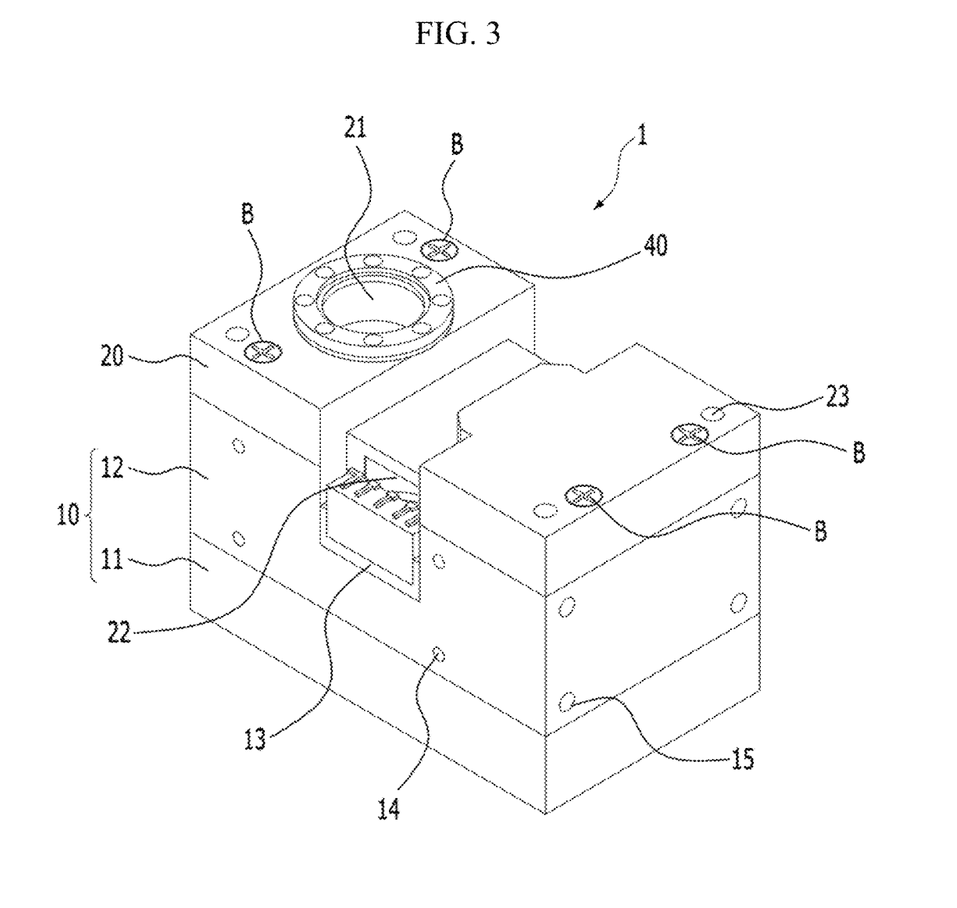
FIG. 3 is a schematic perspective view of an actuator module according to an embodiment of the present invention.
Figure 4:
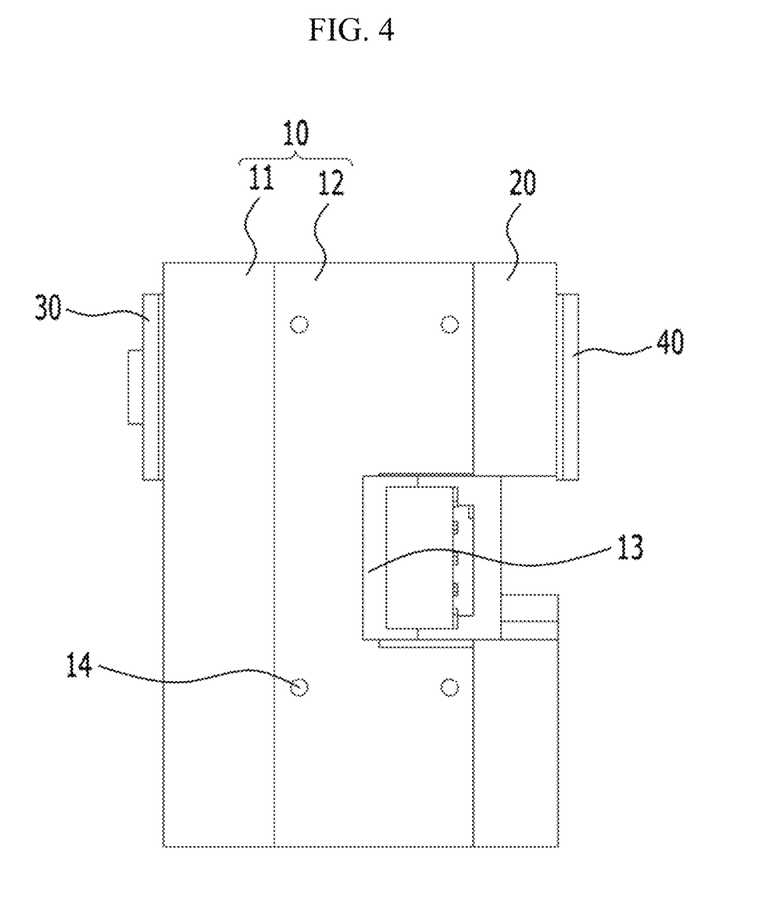
FIG. 4 is a side view of the actuator module according to the embodiment of the present invention.
Figure 5:
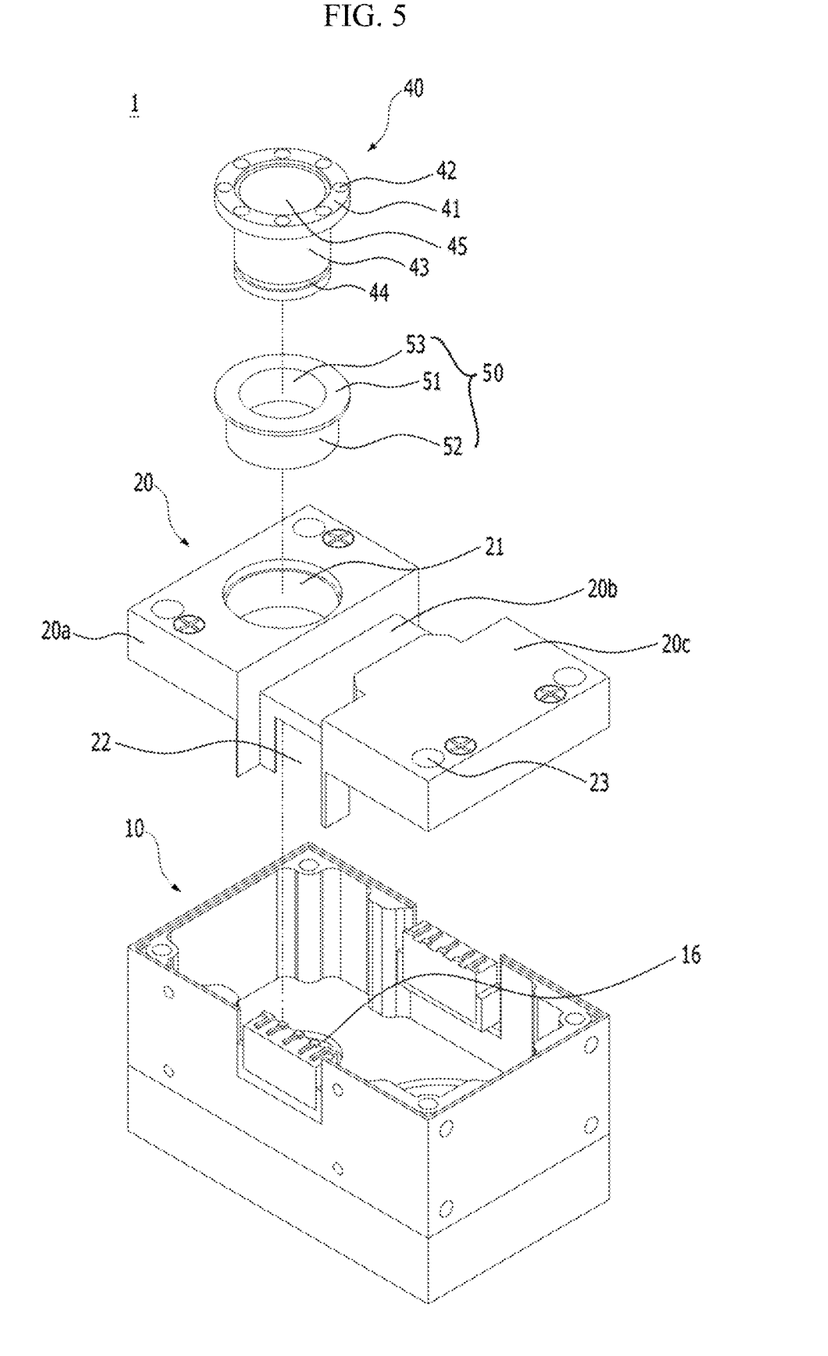
FIG. 5 is an exploded perspective view of the actuator module according to the embodiment of the present invention.

FIG. 3 is a schematic perspective view of an actuator module according to an embodiment of the present invention, FIG. 4 is a side view of the actuator module according to the embodiment of the present invention, and FIG. 5 is an exploded perspective view of the actuator module according to the embodiment of the present invention.

As shown in the drawings, an actuator module 1 includes a first housing 10 and a second housing 20. Here, an actuator is a device configured to operate a machine or a mechanism using power and is generally implemented using an electric motor. The actuator module includes a reduction gear together with a motor as a driving portion, and includes control circuits for the reduction gear and the motor.

The first housing 10 and the second housing 20 are collectively referred to as a housing, and this housing constitutes an outer skin or an exterior of the actuator module and protects the motor, the reduction gear, the control circuits, and the like which are included inside the housing. A structure which is directly coupled to another actuator module or to a module connection member configured to connect to another actuator module may be formed at the housing.

An active shaft 30 connected the motor (not shown) may be coupled to pass through the first housing 10 (see FIG. 4). That is, the shaft 30 receiving a driving force through the motor provided inside the actuator module 1 is installed at one surface of the first housing 10. A structure connectable to an external member, e.g., a coupling recess or a horn structure, may be integrally or detachably installed at the shaft 30. A reduction gear may be provided between the actuator motor and the shaft 30.

The first housing 10 may be formed as one body, and alternatively, may be configured as detachable sub-housings. For example, as shown in the drawings, the first housing 10 may include a first sub-housing 11 and a second sub-housing 12. For example, the reduction gear may be provided inside the first sub-housing 11 and the motor may be provided inside the second sub-housing 12. Such a separable structure of the first housing 10 allows a more efficient partitioning of an inner space and facilitates assembly and disassembly.

Meanwhile, a terminal portion 13 may be provided at a side surface of the first housing 10. Cables may be electrically connected to the terminal portion 13, and through the cables and the terminal portion 13, a current may be supplied to the motor provided inside the actuator module 1, or an electrical signal may be transmitted to or received from the control circuits provided inside the actuator module 1. Here, the signal which is transmitted and received through the control circuits may be a control signal for driving the motor or a sensed signal from a sensor provided inside the actuator module 1.

The terminal portion 13 may be provided at each of both side surfaces of the first housing 10, and even in this case, only one terminal portion 13 provided at either of the side surfaces may be used according to convenience of wire connection.

First coupling recesses 14 and 15 may be provided in an outer side surface of the first housing 10, that is, at one or more surfaces among side surfaces, a top surface, and a bottom surface of the first housing 10, for coupling to another actuator module or a module connection member. A female thread may be provided inside each of the first coupling recesses 14 and 15. As shown in the drawing, outer surfaces of the first housing 10 and the second housing 20 may be substantially formed as planar surfaces and screw (bolt) coupled to another actuator module or a module connection member through the first coupling recesses 14 and 15.

The second housing 20 is coupled to the first housing 10. As shown in the drawings, the second housing 20 may be coupled to one surface of the first housing 10, i.e., to a surface opposite the surface through which the shaft 30 is formed to pass. The first housing 10 and the second housing 20 may be coupled by a bolt B, and the bolt B may be inserted through each of four bolt holes provided at one surface of the second housing 20 and be coupled to a female thread provided on an inner side surface of the first housing 10. The coupling between the first housing 10 and the second housing 20 may employ any other coupling including, for example, fitting through a concave-convex structure or the like, other structural couplings, or bonding, or the like.

A passive idler horn 40 provided at a position corresponding to the active shaft 30 may be coupled to and pass through the second housing 20. That is, a second hollow portion 21 coaxial with the active shaft 30 may be provided at one surface of the second housing 20, and the idler horn 40 may be rotatably installed at the second hollow portion 21. The driving force from the motor provided inside the actuator module 1 is not transferred to the idler horn 40, and the idler horn 40 merely serves to support another member when the active shaft 30 transfers the driving force to another member.

A pass-through portion 22 may be provided at a side surface of the second housing 20. The cables connected to the terminal portion 13 through the pass-through portion 22 may extend to an interior of the second housing 20. Meanwhile, since foreign materials and the like may flow inside the housing through the pass-through portion 22 while the pass-through portion 22 is not being used, a cover member (not shown) configured to block the pass-through portion 22 may be provided at the pass-through portion 22. Alternatively, the pass-through portion 22 may be formed when the cover member is removed from the second housing 20.

A second coupling recess 23 may be provided in a front surface of the second housing 20. Like the first coupling recesses 14 and 15, the second coupling recess 23 is provided to couple to another actuator module or a module connection member. Further, a female thread may be provided inside the second coupling recess 23.

The idler horn 40 may be coupled to one surface of the second housing 20 with a tube-shaped bearing 50 having a central portion, in which a hollow portion is formed, and interposed therebetween. Further, the cables may be inserted into the second housing 20 through the hollow portion of the tube-shaped bearing 50.

Referring to FIG. 5, a first hollow portion 16 is installed in the first housing 10 to allow the active shaft 30 to be installed, and in correspondence with the first hollow portion 16, a cylindrical hollow portion 21 is provided in the second housing 20 to allow the passive idler horn 40 to be installed. With such a configuration, the active shaft 30 and the passive idler horn 40 may be coaxially provided.

As shown in the drawings, the idler horn 40 may be coupled to one surface of the second housing 20 with the tube-shaped bearing 50 interposed therebetween.

The idler horn 40 may include a flange 41 having a coupling hole 42, and a cylindrical portion 43 installed to protrude from the flange 41 toward a shaft. For example, the idler horn 40 may be fixed and coupled to another actuator module or a module connection member through the coupling hole 42 provided at the flange 41 (see FIG. 7).

A depressed portion 44 may be provided at an outer side of the cylindrical portion 43 in a circumferential direction thereof, and the idler horn 40 may be coupled, using the depressed portion 44, to the idler horn attaching and detaching device provided inside the second housing 20. Further, an idler horn hollow portion 45 may be provided at a central interior portion of the idler horn 40. As will be described in detail below, the depressed portion 44 provided at the outer side of the cylindrical portion 43 of the idler horn 40 may be concave-convexly coupled with a protrusion 72 of a ring-shaped elastic switch 70.

Meanwhile, the tube-shaped bearing 50 is inserted into the outer side of the cylindrical portion 43 of the idler horn 40 to allow the idler horn 40 to be rotated smoothly. That is, the tube-shaped bearing 50 may be installed between the idler horn 40 and the ring-shaped elastic switch 70.

The tube-shaped bearing 50 may include a bearing flange 51, and include a cylindrical bearing portion 52 installed to protrude from the bearing flange 51 toward the shaft. The bearing flange 51 may be in contact with the flange 41 of the idler horn 40 and may have a diameter that is less than that of the flange 41. The cylindrical bearing portion 52 may be inserted into and coupled to the outer side of the cylindrical portion 43 of the idler horn 40, and a length of the cylindrical bearing portion 52 may be formed to be shorter than that of the cylindrical portion 43 so as to allow the depressed portion 44 provided at the cylindrical portion 43 to be exposed to the outside.

The tube-shaped bearing 50 may be made of a resin. The tube-shaped bearing 50 made of a resin is used such that a smooth rotation of the idler horn 40 is ensured, maintenance is simplified, and economic feasibility is improved.

Referring to FIG. 5, the second housing 20 may include an upper end portion 20a, a lower end portion 20c, and a connection portion 20b for upper and lower ends provided between the upper end portion 20a and the lower end portion 20c. The cylindrical hollow portion 21 which the idler horn 40 may be coupled to and pass through may be formed on a front surface of the upper end portion 20a, and the lower end portion 20c may be formed to have a height substantially the same as a height of the upper end portion 20a. The connection portion 20b for upper and lower ends may be provided between the upper end portion 20a and the lower end portion 20c and be recessed inward. A cover (not shown) may be coupled to the connection portion 20b for upper and lower ends to form a smooth outer surface while protecting the cables.

Figure 6:
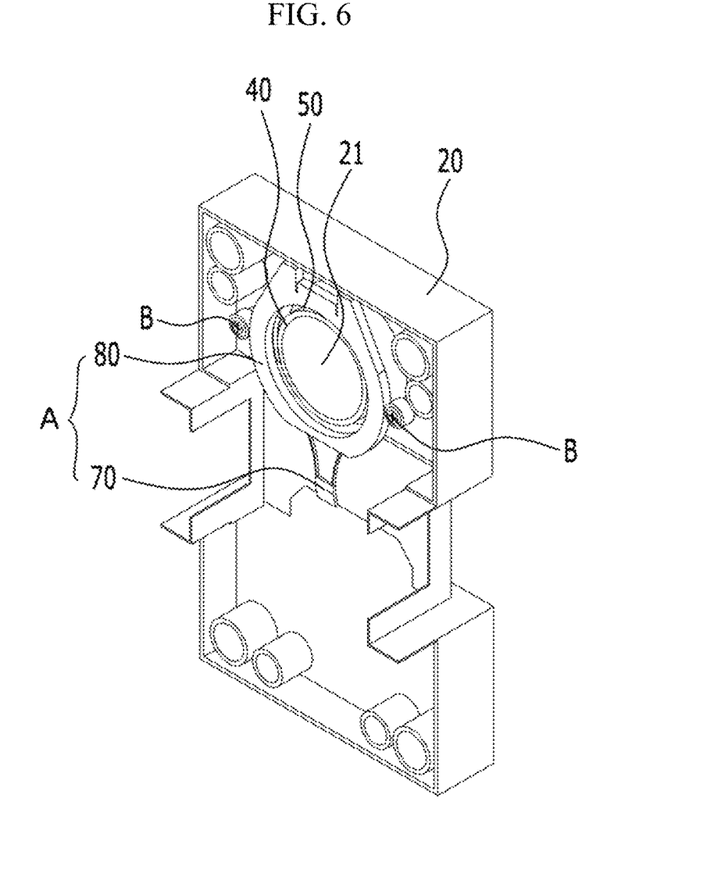
FIG. 6 is a schematic perspective view of an idler horn attaching and detaching device of the actuator module according to the embodiment of the present invention.
Figure 7:
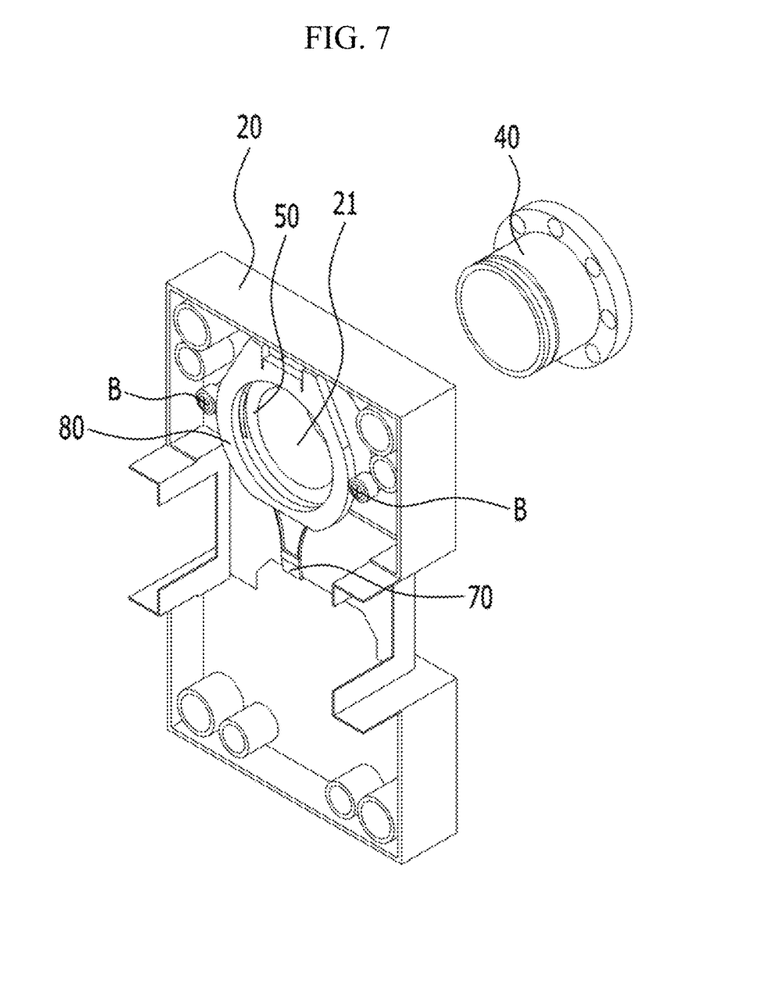
FIG. 7 is a perspective view illustrating a state in which an idler horn is separated from the idler horn attaching and detaching device of FIG. 6.
Figure 8:
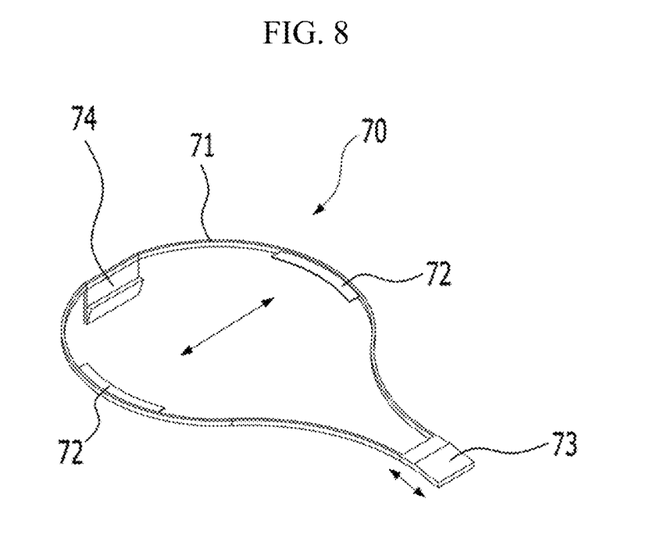
FIG. 8 is a diagram illustrating a ring-shaped elastic switch of the idler horn attaching and detaching device of FIG. 6.
Figure 9:
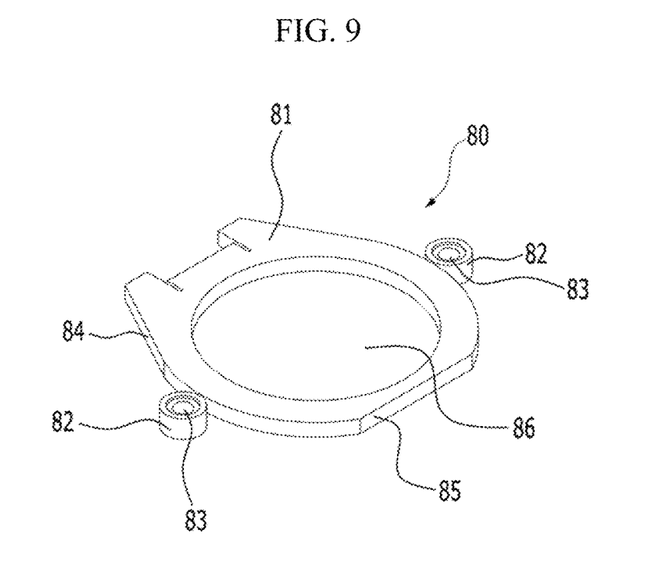
FIG. 9 is a diagram illustrating a ring-shaped cover member of the idler horn attaching and detaching device of FIG. 6.

A configuration of the idler horn attaching and detaching device according to the embodiment of the present invention will be described with reference to FIGS. 6 to 9. FIG. 6 is a schematic perspective view of the idler horn attaching and detaching device of the actuator module according to the embodiment of the present invention, FIG. 7 is a perspective view illustrating a state in which the idler horn is separated from the idler horn attaching and detaching device of FIG. 6, FIG. 8 is a diagram illustrating a ring-shaped elastic switch of the idler horn attaching and detaching device of FIG. 6, and FIG. 9 is a diagram illustrating a ring-shaped cover member of the idler horn attaching and detaching device of FIG. 6.

As shown in the drawings, an idler horn attaching and detaching device A may be formed at one surface of an inner side of the second housing 20, and there is no need to designate a housing at which the idler horn 40 is installed as a second housing, and the housing is not required to have a separable housing structure. That is, the idler horn attaching and detaching device A may be provided at one surface of an inner side of the housing constituting the outer skin of the actuator module which is capable of including the motor, the reduction gear, and the control circuit.

The idler horn attaching and detaching device A may include the ring-shaped elastic switch 70 and a ring-shaped cover member 80, and the ring-shaped elastic switch 70 may be selectively attached to and detached from the idler horn 40 using an elastic force.

The ring-shaped elastic switch 70 is formed to surround an inner side end of the cylindrical hollow portion 21 provided at one surface of the second housing 20.

Further, the ring-shaped cover member 80 is formed to fix the ring-shaped elastic switch 70. Referring to FIG. 6, the ring-shaped cover member 80 may cover almost an entire surface of the ring-shaped elastic switch 70, and may be coupled to an inner side surface of the second housing 20 by a bolt B. However, a trigger ring 73 of the ring-shaped elastic switch 70 is provided to protrude outward without being covered by the ring-shaped cover member 80.

As described above, the idler horn attaching and detaching device A may be installed at the inner side end of the cylindrical hollow portion 21 of the second housing 20. The tube-shaped bearing 50 may be first inserted into and be in contact with an inner side of the cylindrical hollow portion 21, the cylindrical portion 43 of the idler horn 40 may be inserted into and pass through an inner side of the hollow portion 53 of the tube-shaped bearing 50 (see FIG. 5), and then the cylindrical portion 43 may be coupled to the ring-shaped elastic switch 70 of the idler horn attaching and detaching device A.

A configuration of the ring-shaped elastic switch will be described in detail with reference to FIG. 8. As shown in the drawing, the ring-shaped elastic switch 70 may include a ring-shaped main body 71, the protrusion 72, the trigger ring 73, and a protruding piece 74 for fixing.

That is, the ring-shaped elastic switch 70 includes the protrusion 72 installed to protrude inward in the cylindrical hollow portion 21 of the second housing 20, and the trigger ring 73 installed to protrude outward in the cylindrical hollow portion 21 of the second housing 20 (see FIG. 6). Here, the protrusion 72 may be moved according to an external pressure applied to the trigger ring 73 such that the protrusion 72 and the idler horn 40 may be engaged with each other or released from each other.

A pair of protrusions 72 may be provided, and the pair of protrusions 72 may be formed at positions facing each other at the ring-shaped main body 71 of the ring-shaped elastic switch 70. Further, the trigger ring 73 may be installed between the pair of protrusions 72 in the ring-shaped main body 71, and the pair of protrusions 72 may be moved in a direction opposite the shaft direction as the trigger ring 73 is moved in the shaft direction of the cylindrical hollow portion 21. That is, as shown in FIG. 8, the pair of protrusions 72 may be installed at left and right sides of the ring-shaped main body 71, the trigger ring 73 may be installed at a lower side thereof, and the protruding piece 74 for fixing may be installed at an upper side thereof.

For example, the ring-shaped elastic switch 70 may have elasticity because the ring-shaped elastic switch 70 includes a thin ring-shaped main body 71, and may be made of a resin. Therefore, as shown in FIG. 8, when the trigger ring 73 is moved upward and downward in a state in which the protruding piece 74 for fixing the ring-shaped elastic switch 70 is fixed and coupled to a predetermined point on the inner side surface of the second housing 20, the protrusions 72 are moved in a left-right direction due to an elastic force of the ring-shaped main body 71. That is, the trigger ring 73 and the protrusions 72 are moved in opposite directions on the basis of the shaft direction of the cylindrical hollow portion 21.

When a user pushes the trigger ring 73 upward, a distance between the pair of protrusions 72 is increased. The depressed portion 44 provided at the outer side of the cylindrical portion 43 of the idler horn 40 may be disposed between the pair of protrusions 72, and in this state, the pair of protrusions 72 may be inserted into and coupled with the depressed portion 44. When releasing the idler horn 40, the user pushes the trigger ring 73 upward to increase the distance between the pair of protrusions 72. Then, the protrusions 72 are released from the depressed portion 44, and in this state, the idler horn 40 is removed from the idler horn attaching and detaching device A. That is, the idler horn 40 is detached from the second housing 20. Further, the pair of protrusions 72 return to original positions thereof when the external pressure applied to the trigger ring 73 is removed.

Meanwhile, in order to couple the idler horn 40 to the idler horn attaching and detaching device A, like the above-described release, the trigger ring 73 is pushed upward to increase the distance between the pair of protrusions 72, and in this state, the cylindrical portion 43 of the idler horn 40 is inserted into the hollow portion 21. When an end of the cylindrical portion 43 of the idler horn 40 has a tapered shape, only an operation of inserting the idler horn 40 into the hollow portion 21 is performed, without the user operating the trigger ring 73, such that the distance between the pair of protrusions 72 is increased and the depressed portion 44 and the pair of protrusions 72 may be coupled.

Next, a configuration of the ring-shaped cover member will be described in detail with reference to FIG. 9. The ring-shaped cover member 80 may include a cover main body 81 and a protrusion 82 provided on both side surfaces of the cover main body 81. A coupling recess 83 for bolt connection may be provided at the protrusion 82, and the ring-shaped cover member 80 may be fixed and coupled to the inner side surface of the second housing 20 by the coupling recess 83.

Further, a side surface 84 is formed at an edge of the cover main body 81. Due to the side surface 84 of the ring-shaped cover member 80, the cover main body 81 is formed to have a sufficient size so as not to hinder a movement (an elastic movement, or a triggering action) of the ring-shaped elastic switch 70 covered by the ring-shaped cover member 80.

The side surface 84 is not formed at a lower side of the cover main body 81, such that an opening 85 is provided. Even when the ring-shaped elastic switch 70 is covered by the ring-shaped cover member 80, the trigger ring 73 of the ring-shaped elastic switch 70 protrudes outward through the opening 85 (see FIG. 6) such that the user can manipulate the trigger ring 73.

A cover hollow portion 86 is provided in a central portion of the cover main body 81 such that the cables (not shown) may be connected inside and outside the second housing 20 through the cover hollow portion 86.

As described above, the idler horn attaching and detaching device A is used such that the idler horn 40 can be easily attached to or detached from the actuator module.

The above-described description of the present invention is intended only for an illustrative purpose, and it can be easily understood that other concrete forms can be devised by those skilled in the art without changing or modifying the technical spirit or essential characteristics of the present invention. Therefore, it should be understood that the above-described embodiment is not restrictive but illustrative in all aspects. For example, each component described as a single form may be distributed and implemented, and similarly, components described as being distributed may also be implemented in a combined form.

The scope of the present invention is defined by the appended claims, and all alternations or modifications derived from the meaning and scope of the claims and their equivalents should be construed as being included within the scope of the present invention.

The invention claimed is:

1. A device for attaching and detaching an idler horn of an actuator module, which allows a motor, a reduction gear, and a control circuit to be included therein, the device comprising:
    a ring-shaped elastic switch configured to surround an inner side end of a cylindrical hollow portion provided in one surface of a housing which constitutes an outer surface of the actuator module, the ring-shaped elastic switch comprising a protrusion installed to protrude inward in the cylindrical hollow portion and a trigger ring installed to protrude outward in the cylindrical hollow portion; and
    a ring-shaped cover member configured to fix the ring-shaped elastic switch and coupled to an inner side surface of the housing,
    wherein the ring-shaped cover member is configured to cover an entire surface of the ring-shaped elastic switch except the trigger ring protruding outward,
    wherein the ring-shaped elastic switch is selectively attached to and detached from the idler horn using an elastic force.

2. The device of claim 1,
    wherein the protrusion of the ring-shaped elastic switch is configured to move based on an external pressure applied to the trigger ring such that the protrusion and the idler horn are engaged with each other or released from each other.

3. The device of claim 2, wherein the protrusion is provided as a pair of protrusions, and the pair of protrusions are formed at positions facing each other in a ring-shaped main body of the ring-shaped elastic switch.

4. The device of claim 3, wherein the trigger ring is installed at a position between the pair of protrusions in the ring-shaped main body, and the pair of protrusions are configured to move in a direction opposite a shaft direction as the trigger ring is moved in the shaft direction.

5. The device of claim 2, wherein the idler horn includes:
    a flange having a coupling hole; and
    a cylindrical portion installed to protrude from the flange in a shaft direction,
    wherein a depressed portion is formed at an outer side of the cylindrical portion in a circumferential direction thereof and is concave-convexly coupled with the protrusions of the ring-shaped elastic switch.

6. The device of claim 1, wherein a tube-shaped bearing is installed between the ring-shaped elastic switch and the idler horn.

* * * * *